United States Patent [19]
Masaki

[11] Patent Number: 5,608,385
[45] Date of Patent: Mar. 4, 1997

[54] DEVICE FOR DETERMINING STATE OF ELECTRICITY GENERATION OF SOLAR BATTERY

[75] Inventor: Junya Masaki, Kanagawa-ken, Japan

[73] Assignee: Canon Kabushiki Kaisha, Tokyo, Japan

[21] Appl. No.: 446,221

[22] Filed: May 22, 1995

[30] Foreign Application Priority Data

May 26, 1994 [JP] Japan ................................. 6-134903

[51] Int. Cl.$^6$ ............................................ G08B 21/00
[52] U.S. Cl. ........................... 340/636; 323/906; 324/433; 320/48
[58] Field of Search .......................... 323/906; 320/48; 340/636; 324/433, 435

[56] References Cited

U.S. PATENT DOCUMENTS

| | | | |
|---|---|---|---|
| 4,328,456 | 5/1982 | Suzuki et al. | 323/906 |
| 4,661,758 | 4/1987 | Whittaker | 323/906 |
| 4,728,878 | 3/1988 | Anthony | 323/906 |
| 4,812,737 | 3/1989 | Fleck | 323/906 |
| 5,270,636 | 12/1993 | Lafferty | 323/906 |
| 5,293,447 | 3/1994 | Fanney et al. | 323/906 |
| 5,298,850 | 3/1994 | Matsui | 320/48 |
| 5,424,800 | 6/1995 | Suzuki | 320/48 |

*Primary Examiner*—Jeffery Hofsass
*Assistant Examiner*—Timothy Edwards, Jr.
*Attorney, Agent, or Firm*—Robin, Blecker, Daley & Driscoll

[57] ABSTRACT

A device for determining a state of electricity generation of a solar battery and an apparatus, such as a camera, including such a device are disclosed. The device comprises a first circuit for connecting different loads to the solar battery, and a second circuit for determining a state of electricity generation of the solar battery in accordance with a state of a load current of the solar battery relative to the different loads.

26 Claims, 8 Drawing Sheets

DEVICE FOR DETERMINING STATE OF ELECTRICITY GENERATION OF SOLAR BATTERY

BACKGROUND OF THE INVENTION

1. Field of the Invention

The present invention relates to a device for determining the state of electricity generation of a solar battery for use in an apparatus such as a camera.

2. Description of the Related Art

FIG. 8 is a block diagram showing the circuit arrangement of a conventional device provided with the function of detecting the electricity generating capability (the state of electricity generation) of a solar battery.

The circuit arrangement shown in FIG. 8 includes a solar battery 51 composed of a plurality of solar cells connected in series, a secondary battery 52, such as a lithium-ion battery, for storing the electrical energy generated by the solar battery 51, an overcharging preventing circuit 53 for protecting the secondary battery 52 from being overcharged with the electrical energy generated by the solar battery 51, a diode 54 which serves as a reverse-current preventing element for preventing electric current from flowing back to the solar battery 51, and diodes 55 and 56 which serve as similar reverse-current preventing elements.

The circuit arrangement shown in FIG. 8 also includes a voltage detecting circuit 57 composed of an amplifier 57a, an A/D converter 57b and the like. The voltage detecting circuit 57 serves to detect an electric current which flows through a resistance 58 located in a charging loop for charging the secondary battery 52, and convert the detected electric current into an output voltage. The shown circuit arrangement also includes a CPU 59 for performing display control of a display 60 (which will be described later) in accordance with the output of the voltage detecting circuit 57, and the display 60 for visually displaying the electricity generating capability of the solar battery 51. The display 60 is arranged to visually display the electricity generating capability by means of, for example, four segments SEG1 to SEG4 as shown in FIG. 9.

In the above-described circuit arrangement, the voltage across the resistance 58 located in the charging loop for charging the secondary battery 52, which voltage corresponds to the electricity generating capability of the solar battery 51, is amplified by the amplifier 57a provided in the voltage detecting circuit 57 and is then A/D-converted by the A/D converter 57b. The obtained voltage information is outputted from the A/D converter 57b to the CPU 59. When receiving this voltage information, the CPU 59 drives and controls the display 60. In this manner, the user can readily know the electricity generating capability of the solar battery 51. FIG. 9 shows the state in which all the segments SEG1 to SEG4 are turned on to indicate that the electricity generating capability of the solar battery 51 is sufficiently high.

However, the above-described conventional device involves a number of problems. For example, the resistance 58 is located in the charging loop for charging the secondary battery 52 with the electrical energy generated by the solar battery 51, and the voltage produced across the resistance 58 is temporarily amplified by the amplifier 57a, such as an operational amplifier, provided in the voltage detecting circuit 57. This arrangement consumes an electric current of approximately several milliamperes because the amplifier 57a needs to be operated.

If a predetermined amount of electrical energy is not stored in the secondary battery 52, electric power is supplied from only the solar battery 51 to operate the voltage detecting circuit 57. During this time, if the electricity generating capability of the solar battery 51 is smaller than the rate of current consumption of the amplifier 57a, the circuit becomes unable to detect the voltage across the resistance 58 and to provide a visual display indicative of the detected voltage level.

One approach to the above-described problems is to adopt an arrangement for detecting the voltage across the resistance 58 by only the A/D converter 57b without using the amplifier 57a, as shown in FIG. 10. In this arrangement, however, since only a small charging current flows through the resistance 58, it is necessary to increase the resistance value of the resistance 58 so as to generate a voltage equivalent to the voltage amplified by the amplifier 57a. In other words, it is necessary to set the resistance value of the resistance 58 to (resistance value×amplification magnification) times the resistance value that is required when the amplifier 57a is used. Therefore, a resistance having a large value needs to be used in the charging loop for charging the secondary battery 52 with the generated electrical energy, and the charging efficiency is degraded when a large amount of charging current is applied.

SUMMARY OF THE INVENTION

It is, therefore, an object of the present invention to provide a device suitable for determining a state of electricity generation of a solar battery, which device comprises first means for connecting different loads to the solar battery and second means for determining a state of electricity generation of the solar battery in accordance with a state of a load current of the solar battery relative to the different loads.

Another object of the present invention is to provide an apparatus, such as a camera, including such a device.

The above and other objects and aspects of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below in detail with reference to the accompanying drawings.

Figure 1:
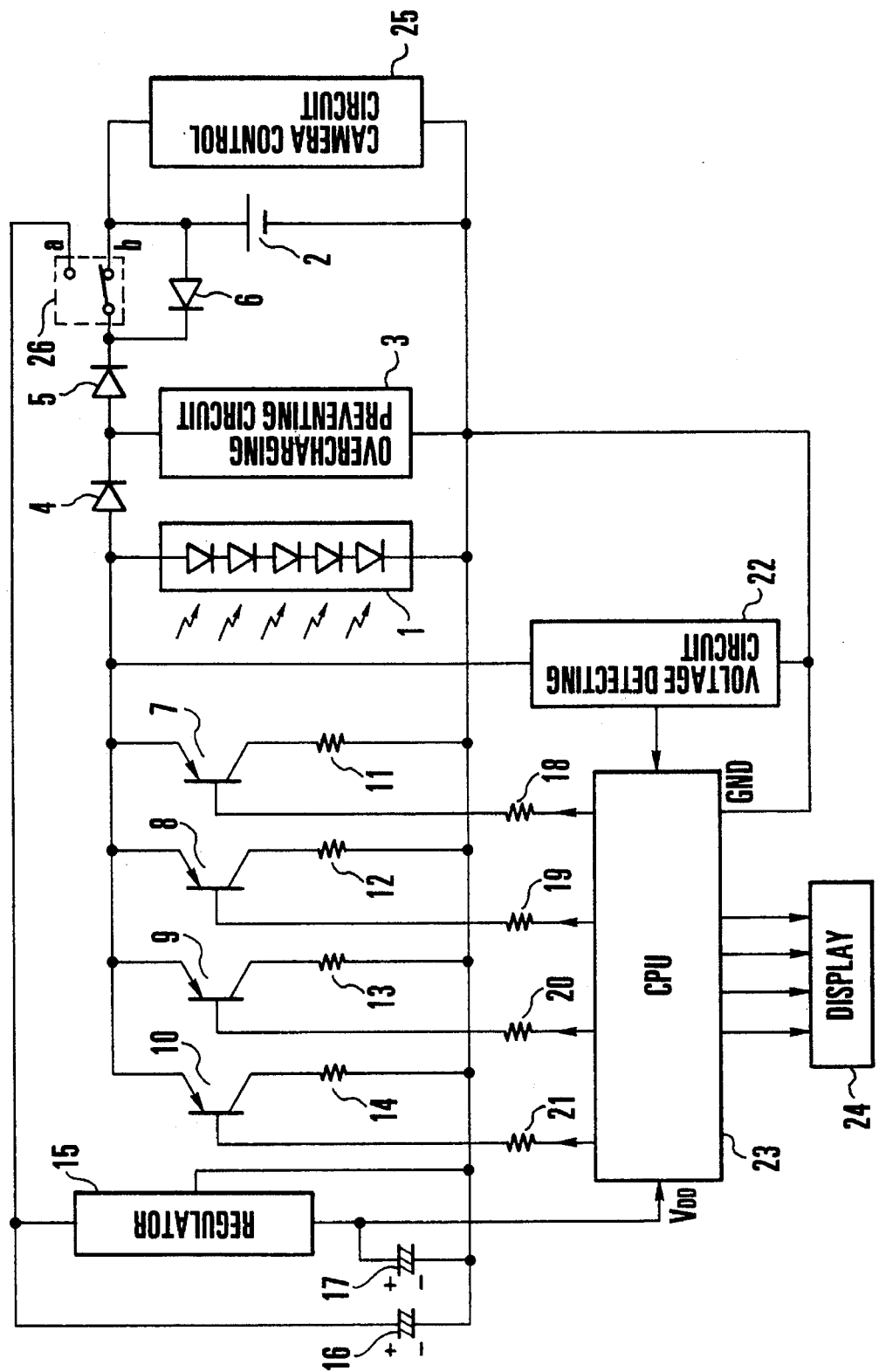
FIG. 1 is a circuit diagram showing the arrangement of a power source device which uses a solar battery according to a first embodiment of the present invention.

FIG. 1 is a circuit diagram showing the arrangement of a device for detecting the electricity generating capability (the state of electricity generation) of a solar battery according to a first embodiment of the present invention. FIG. 1 shows one example in which such a device is applied to a camera.

The arrangement shown in FIG. 1 includes a solar battery 1 composed of a plurality of solar cells connected in series, a secondary battery 2, such as a lithium-ion battery, for storing the electrical energy generated by the solar battery 1, an overcharging preventing circuit 3 for protecting the secondary battery 2 from being overcharged with the electrical energy generated by the solar battery 1, a diode 4 which serves as a reverse-current preventing element for preventing electric current from flowing back to the solar battery 1, a diode 5 which serves as a reverse-current preventing element for preventing electric current from flowing back from the secondary battery 2 to the overcharging preventing circuit 3, and a diode 6 which serves as a reverse-current preventing element for preventing electric current from a capacitor and the like (which will be described later) to the secondary battery 2.

The arrangement shown in FIG. 1 also includes switching transistors 7, 8, 9 and 10 as well as resistances 11, 12, 13 and 14. The switching transistors 7, 8, 9 and 10 are used in detecting the electricity generating capability of the solar battery 1, and are turned on by a CPU 23 (which will be described later) in sequential order, i.e., in the order of the switching transistors 7→8→9→10, at the time of detection of the electricity generating capability of the solar battery 1. The resistances 11, 12, 13 and 14 are load-current switching resistances each of which is to be connected to the solar battery 1 when a respectively one of the switching transistors 7, 8, 9 and 10 is turned on. The respective resistances 11, 12, 13 and 14 have resistance values $R_{11}$ to $R_{14}$ in the relation of "$R_{11}>R_{12}>R_{13}>R_{14}$". The shown arrangement also includes a regulator 15 having, for example, a CMOS construction, for supplying the output of either of the solar battery 1 and the secondary battery 2 to the CPU 23 as constant electric power, a capacitor 16 for stabilizing electric power, and a capacitor 17 for stabilizing the electric power to be supplied to the CPU 23 and a display 24 both of which will be described later. As can be seen from the directions of the respective diodes 5 and 6, the electric power is supplied from the higher-voltage side of the solar battery 1 and the secondary battery 2. Resistances 18, 19, 20 and 21 are resistances for limiting the base currents of the switching transistors 7, 8, 9 and 10, respectively.

The arrangement shown in FIG. 1 includes a voltage detecting circuit 22 (which will be described later in detail) for outputting a signal on the basis of which the CPU 23 (which will be described later) determines the state of the voltage level of the solar battery 1, the CPU 23 for determining the state of the voltage level, i.e., the electricity generating capability, of the solar battery 1 on the basis of the output of the voltage detecting circuit 22 and driving and controlling the display 24 which will be described later, the display 24, such as an LCD, for visually displaying the power level of the solar battery 1 (i.e., the electricity generating capability), a camera control circuit 25 which operates by being supplied with the electric power from the secondary battery 2 which serves as a primary power source, and a switch 26 which can be switched by, for example, the user. If the contact piece of the switch 26 is switched to the side of a contact "b" (the state shown in FIG. 1), the electrical energy generated by the solar battery 1 is supplied to the secondary battery 2, thereby effecting charging of the secondary battery 2. If the contact piece is switched to the side of a contact "a", the solar battery 1 and the secondary battery 2 are connected to power sources (the capacitors 16 and 17) for electricity-generating-capability detecting means (which includes the switching transistors 7 to 10 and the resistances 11 to 14 as well as the resistances 18 to 21, the voltage detecting circuit 22 and the CPU 23.

Figure 2:
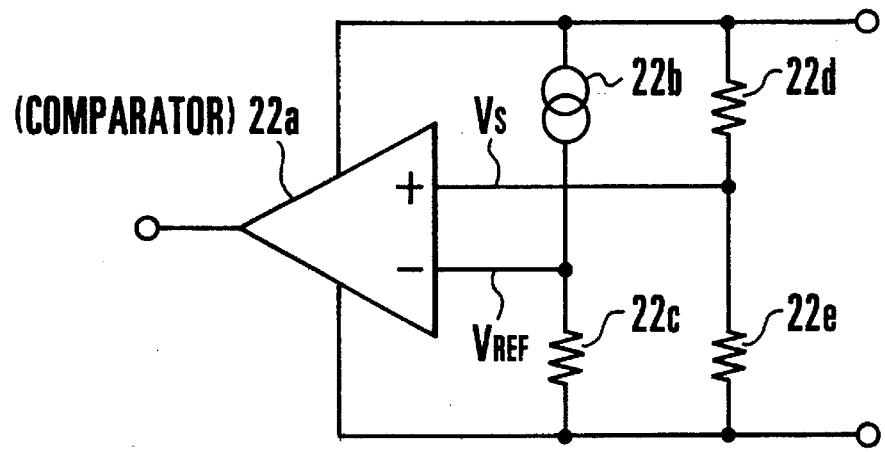
FIG. 2 is a circuit diagram showing a specific example of the construction of the voltage detecting circuit shown in FIG. 1.

FIG. 2 is a circuit diagram showing a specific example of the construction of the voltage detecting circuit 22.

The voltage detecting circuit 22 shown in FIG. 2 includes a comparator 22a having, for example, a CMOS construction, a constant current source 22b, and resistances 22c, 22d and 22e. The constant current source 22b and the resistance 22c serve to generate a reference voltage $V_{REF}$, and the reference voltage $V_{REF}$ is applied to the inverting input terminal of the comparator 22a. The resistances 22d and 22e serve to divide the voltage of the solar battery 1 when the switching transistors 7 to 10 are sequentially turned on and the respective load resistances 11 to 14 are correspondingly connected to the solar battery 1.

A divided voltage $V_S$ is applied to the non-inverting input terminal of the comparator 22a.

In the above-described construction, the comparator 22a compares the reference voltage $V_{REF}$ generated by the constant current source 22b and the resistance 22c with the divided voltage $V_S$ of the solar battery 1 produced by the resistances 22d and 22e. If the divided voltage $V_S$ is lower than the reference voltage $V_{REF}$, the comparator 22a outputs a low-level signal to the CPU 23.

Figure 3:
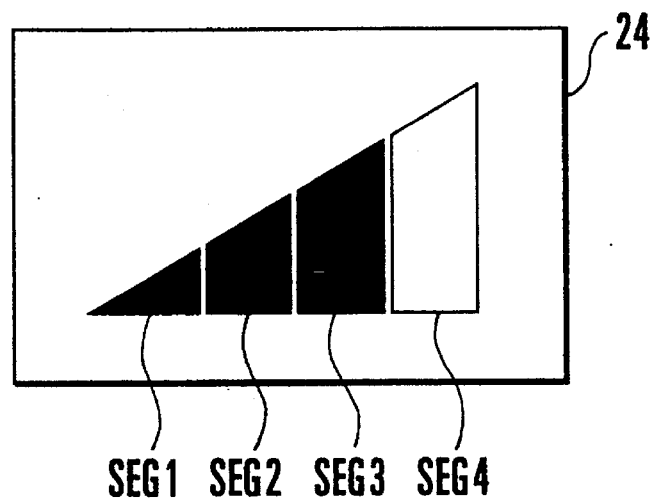
FIG. 3 is a schematic view showing the construction of the display shown in FIG. 1.

FIG. 3 is a schematic view showing the display construction of the display 24.

The display 24 includes the four segments SEG1 to SEG4, and the respective segments SEG1 to SEG4 correspond to the on-off operations of the switching transistors 7 to 10. More specifically, when the switching transistor 7 is on, if a high-level signal is inputted to the CPU 23 from the voltage detecting circuit 22 (the comparator 22a), the segment SEG1 is turned on by the CPU 23. Then, when the switching transistor 8 is on, if a high-level signal is inputted to the CPU 23 from the voltage detecting circuit 22, the segment SEG2 is turned on by the CPU 23. Then, when the switching transistor 9 is on, if a high-level signal is inputted to the CPU 23 from the voltage detecting circuit 22, the segment SEG3 is turned on by the CPU 23. Finally, when the switching transistor 10 is on, if a high-level signal is inputted to the CPU 23 from the voltage detecting circuit 22, the segment SEG4 is turned on by the CPU 23.

If a high-level signal is inputted to the CPU 23 from the voltage detecting circuit 22 when the switching transistor 8 is on, but a low-level signal is inputted to the CPU 23 from the voltage detecting circuit 22 when the switching transistor 9 is on, the segments SEG1 and SEG2 are turned on and the segments SEG3 and SEG4 are turned off, by the CPU 23. If a high-level signal is inputted to the CPU 23 from the voltage detecting circuit 22 when the switching transistor 9 is on, but a low-level signal is inputted to the CPU 23 from the voltage detecting circuit 22 when the switching transistor 10 is on, the segments SEG1 to SEG3 are turned on and the segment SEG4 is turned off, by the CPU 23, as shown in FIG. 3.

Since the display 24 is made to perform the above-described display operation, the user can know the state of electricity generation, i.e., the electricity generating capability, of the solar battery 1 at desired times.

In the above-described arrangement, normally, the contact piece of the switch 26 is connected to the contact "b" as shown in FIG. 1, i.e., the charging loop is formed. Accordingly, during this state, the electrical energy generated by the incidence of light on the solar battery 1 is supplied to the secondary battery 2 through the diodes 4 and 5 and the switch 26, whereby the secondary battery 2 is charged. When a predetermined amount of electrical energy (for the capacity of a secondary battery) is stored in the secondary battery 2, the overcharging preventing circuit 3 operates to prevent the secondary battery 2 from being overcharged with the electrical energy (a discharging loop is formed). Thereafter, the electrical energy generated by the solar battery 1 is not supplied to the secondary battery 2 until the charged voltage of the secondary battery 2 decreases to a predetermined voltage. The secondary battery 2 charged in the above-described manner is employed as the primary power source for the camera control circuit 25.

Figure 4:
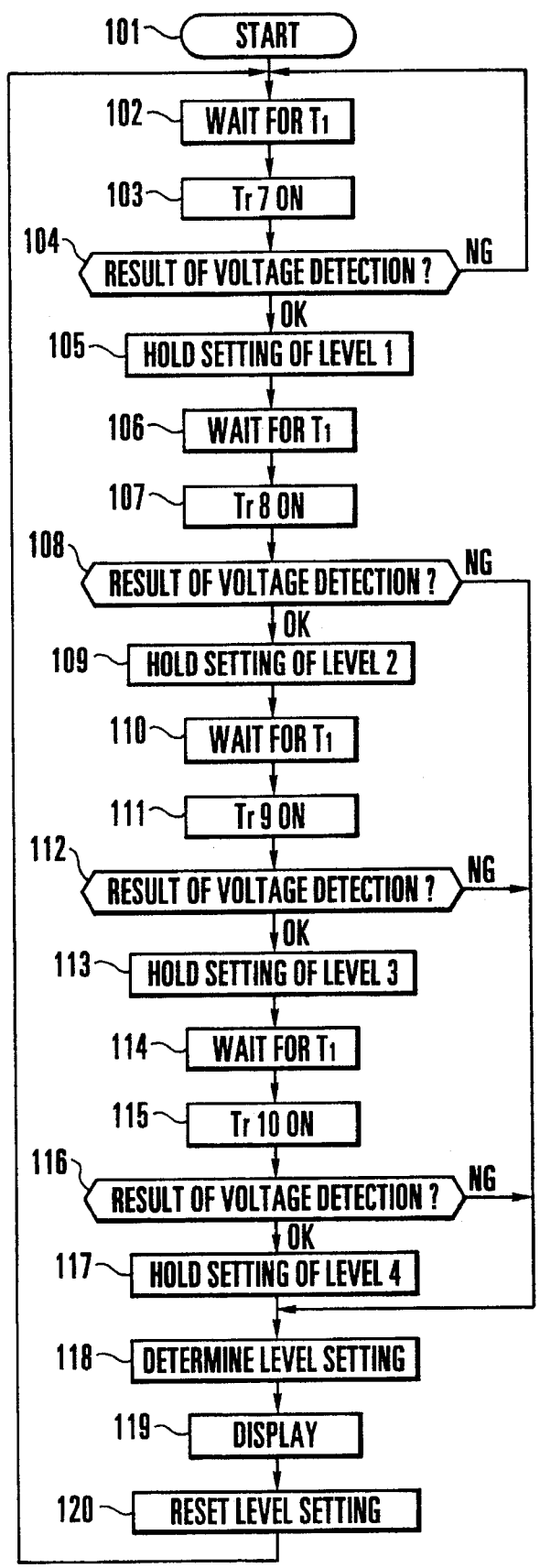
FIG. 4 is a flowchart showing the operation of detecting the electricity generating capability of the solar battery according to the first embodiment of the present invention.

The operation of the CPU 23 when the user switches the switch 26 to the side of the contact "a" to know the electricity generating capability of the solar battery 1 will be described below with reference to the flowchart shown in FIG. 4.

If the switch 26 is switched to the side of the contact "a", electric power is supplied to the CPU 23 from the higher-voltage side of the solar battery 1 and the secondary battery 2. At this time, the process proceeds from Step 101 to Step 102. In Step 102, the CPU 23 is activated and waits for a predetermined time $T_1$ to elapse. When the predetermined time $T_1$ elapses, the process proceeds to Step 103, in which the switching transistor (Tr) 7 is held in its on state for a predetermined time. When the switching transistor 7 is on, the electric current generated by the solar battery 1 flows to the resistance 11, and the voltage produced across the resistance 11 is detected by the voltage detecting circuit 22 in the above-described manner and the voltage detecting circuit 22 outputs a high- or low-level signal. In the next step 104, the CPU 23 makes a determination as to the result of this voltage detection. If the CPU 23 determines that a low-level signal has been inputted, then the CPU 23 determines that the electricity generating capability of the solar battery 1 has not reached Level 1, and returns the process to Step 102. The electricity generating capability of Level 1 takes on a value which is determined by the following expression:

Level-1 generated current $(A)$=(voltage-detecting-means reference voltage $(V)$/resistance 11 $(\Omega)$)

In this case, the CPU 23 turns off all of the segments SEG1 to SEG4 of the display 24. Thus, the user can know that the current electricity generating capability of the solar battery 1 is lower than Level 1. This state of the display 24 also indicates that the solar battery 1 is not at all generating electrical energy.

If it is determined in Step 104 that a high-level signal has been inputted from the voltage detecting circuit 22 (the result of the voltage detection is OK), the process proceeds from Step 104 to Step 105, in which the setting of Level 1 is held. Then, after a wait of the predetermined time $T_1$ in Step 106, the process proceeds to Step 107, in which the switching transistor 8 is held in its on state for a predetermined time to select the next load current. Thus, the resistance 12 is connected to the solar battery 1 as a load, and the voltage produced across the resistance 12 is detected by the voltage detecting circuit 22 and the voltage detecting circuit 22 outputs a high- or low-level signal similarly to the processing of Step 103. In the next step 108, the CPU 23 makes a determination as to the result of this voltage detection. If the CPU 23 determines that a low-level signal has been inputted, then the process proceeds to Step 118, in which the CPU 23 determines that the solar battery 1 does not have a sufficient electricity generating capability to turn on the segment SEG2, and causes the process to proceed to Step 119. In Step 119, only the segment SEG1 of the display 24 is turned on.

If it is determined in Step 108 that a high-level signal has been inputted from the voltage detecting circuit 22 (the result of the voltage detection is OK), the process proceeds from Step 108 to Step 109, in which the setting of Level 2 is held. Then, after a wait of the predetermined time $T_1$ in Step 110, the process proceeds to Step 111, in which the switching transistor 9 is held in its on state for a predetermined time to select the next load current. Thus, the resistance 13 is connected to the solar battery 1 as a load, and the voltage produced across the resistance 13 is detected by the voltage detecting circuit 22 and the voltage detecting circuit 22 outputs a high- or low-level signal similarly to the processing of Step 107. In the next step 112, the CPU 23 makes a determination as to the result of this voltage detection. If the CPU 23 determines that a low-level signal has been inputted, then the process proceeds to Step 118 similarly to the processing of Step 108. In Step 118, the CPU 23 determines that the solar battery 1 does not have a sufficient electricity generating capability to turn on the segment SEG3, and causes the process to proceed to Step 119. In Step 119, only the segments SEG1 and SEG2 of the display 24 are turned on.

If it is determined in Step 112 that a high-level signal has been inputted from the voltage detecting circuit 22 (the result of the voltage detection is OK), the process proceeds from Step 112 to Step 113, in which the setting of Level 3 is held. Then, after a wait of the predetermined time $T_1$ in Step 114, the process proceeds to Step 115, in which the switching transistor 10 is held in its on state for a predetermined time to select the next load current. Thus, the resistance 14 is connected to the solar battery 1 as a load, and the voltage produced across the resistance 14 is detected by the voltage detecting circuit 22 and the voltage detecting circuit 22 outputs a high- or low-level signal similarly to the processing of Step 111. In the next step 116, the CPU 23 makes a determination as to the result of this voltage detection. If the CPU 23 determines that a low-level signal has been inputted, then the process proceeds to Step 118 similarly to the processing of Step 112. In Step 118, the CPU 23 determines that the solar battery 1 does not have a sufficient electricity generating capability to turn on the segment SEG4, and causes the process to proceed to Step 119. In Step 119, the segments SEG1, SEG2 and SEG3 of the display 24 are turned on.

Figure 5:
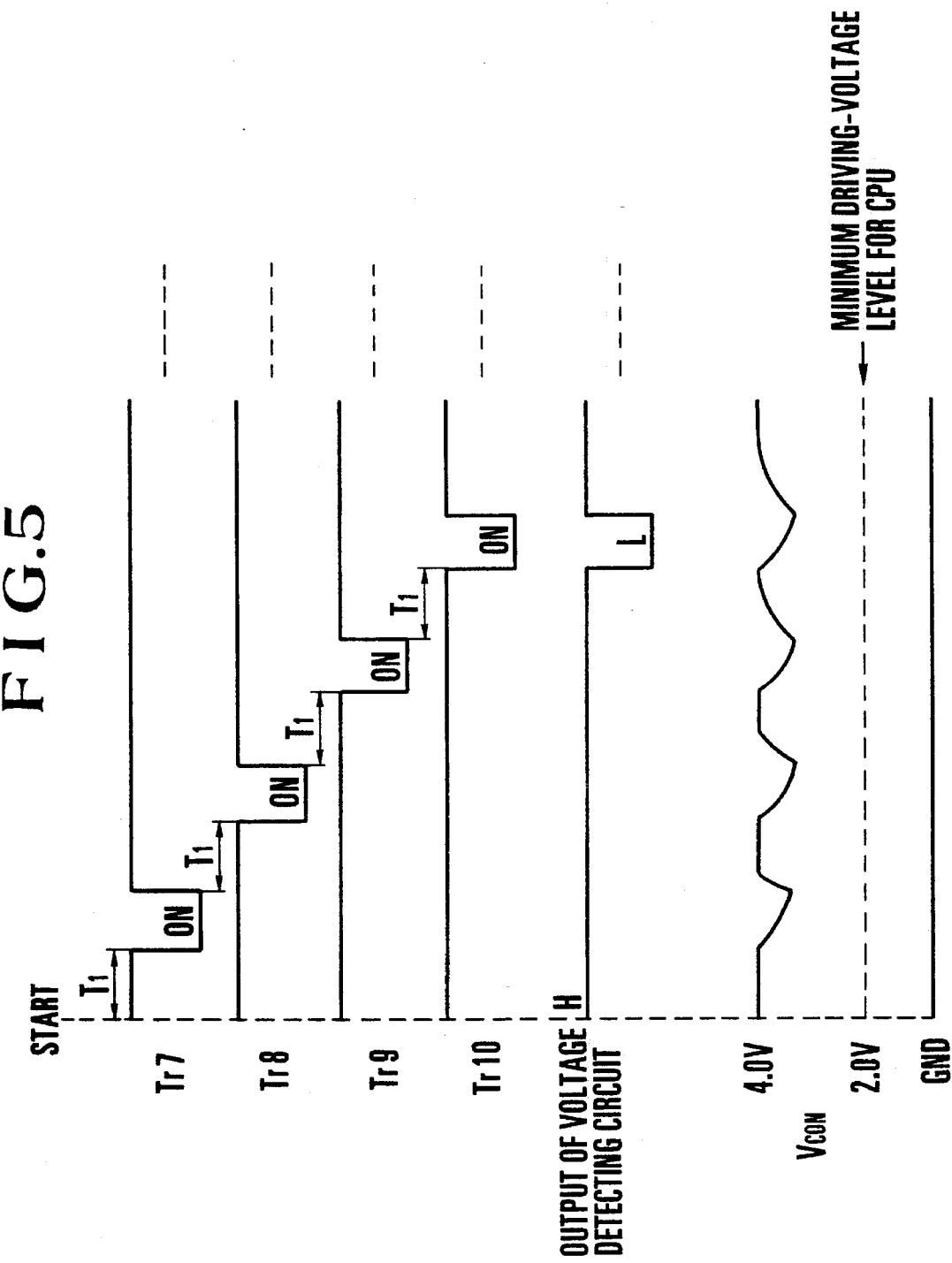
FIG. 5 is a timing chart aiding in explaining the operation of FIG. 4.

The timing chart of the above-described operation is shown in FIG. 5, and the form of the visual display provided on the display 24 in the above-described operation is shown in FIG. 3. As shown in FIG. 5, the source voltage (4 V) of the CPU 23 lowers to a small extent when each of the load resistances is connected.

If it is determined in Step 116 that a high-level signal has been inputted from the voltage detecting circuit 22 (the result of the voltage detection is OK), the process proceeds from Step 116 to Step 117. In Step 117, the CPU 23 determines that the solar battery 1 has a very high electricity generating capability, and causes the process to proceed to Step 119. In Step 119, all the segments SEG1 to SEG4 of the display 24 are turned on.

The above-described operation is repeatedly performed while the switch 26 is switched to the side of the contact "a" and electric power is being supplied.

In the above-described operation of sequentially turning on the switching transistors 7, 8, 9 and 10, the wait time of constant predetermined time $T_1$ is provided between the time during which each of them is turned on and the time during which the next one is turned on. This is intended to make the capacity of each of the capacitors 16 and 17 as small as possible. In other words, in the above-described arrangement in which the higher-voltage side of the solar battery 1 and the secondary battery 2 are selected as an actual circuit power source, if the secondary battery 2 does not at all have electrical energy, the power level of the solar battery 1 will have to be detected with the solar battery 1 alone. In the case of an arrangement having no capacitor, if the generated current is smaller than the required load current, the supply of the electric power required to drive the CPU 23 may be suddenly interrupted while the switching transistors 7, 8, 9 and 10 are sequentially being selected. As a result, it becomes impossible to continue to execute the steps of the flowchart, so that the CPU 23 may be reset or undergo a latch-up and the display 24 may become unable to provide a visual display. To prevent such a phenomenon, backup voltages need to be stored in the respective capacitors 16 and 17. The capacities of the respective capacitors 16 and 17 are set so that the capacitors 16 and 17 can be charged with electricity by an amount corresponding to the predetermined time $T_1$, in order to prevent the power level of the solar battery 1 from becoming lower than the minimum driving voltage required to drive the CPU 23 during the time when each of the switching transistors 7, 8, 9 and 10 is selected. Particularly when the capacities of the capacitors 16 and 17 are to be made as small as possible in terms of space efficiency, a charge time corresponding to the predetermined time $T_1$ is needed.

As a matter of course, the reference voltage $V_{REF}$ of the comparator 22a in the voltage detecting circuit 22 needs to be set higher than the minimum driving voltage for the CPU 23 (refer to FIG. 5) so that malfunction, erroneous detection or accidental resetting of the CPU 23 can be prevented.

Figure 6:
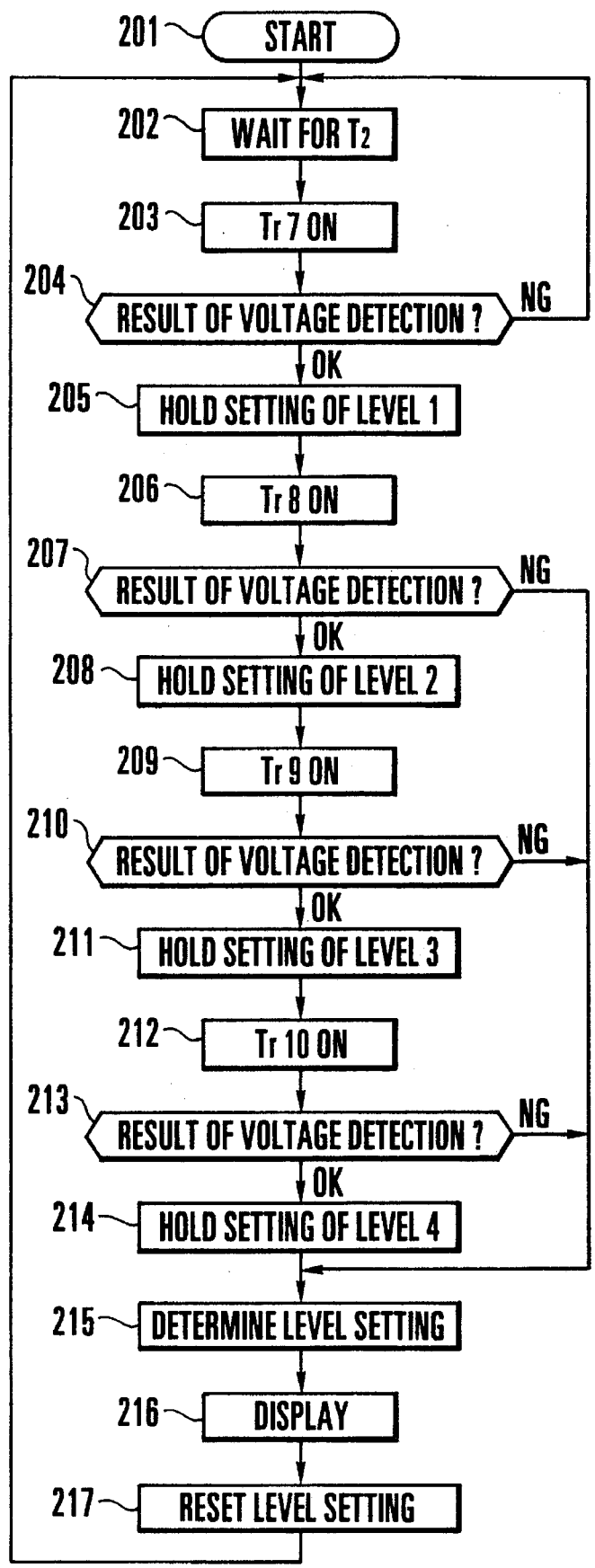
FIG. 6 is a flowchart showing the operation of detecting the electricity generating capability of the solar battery according to a second embodiment of the present invention.
Figure 7:
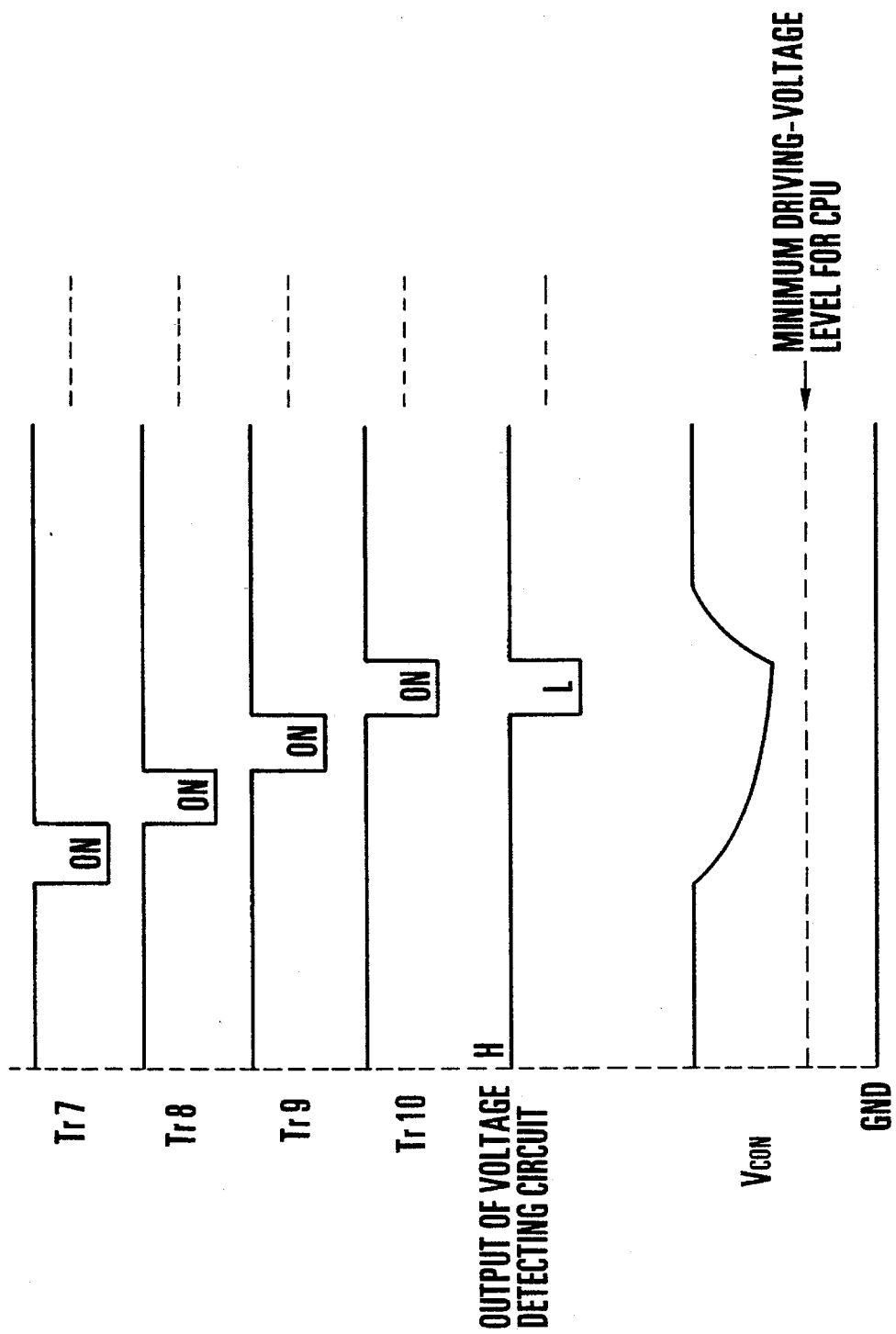
FIG. 7 is a timing chart aiding in explaining the operation of FIG. 6.
Figure 8:
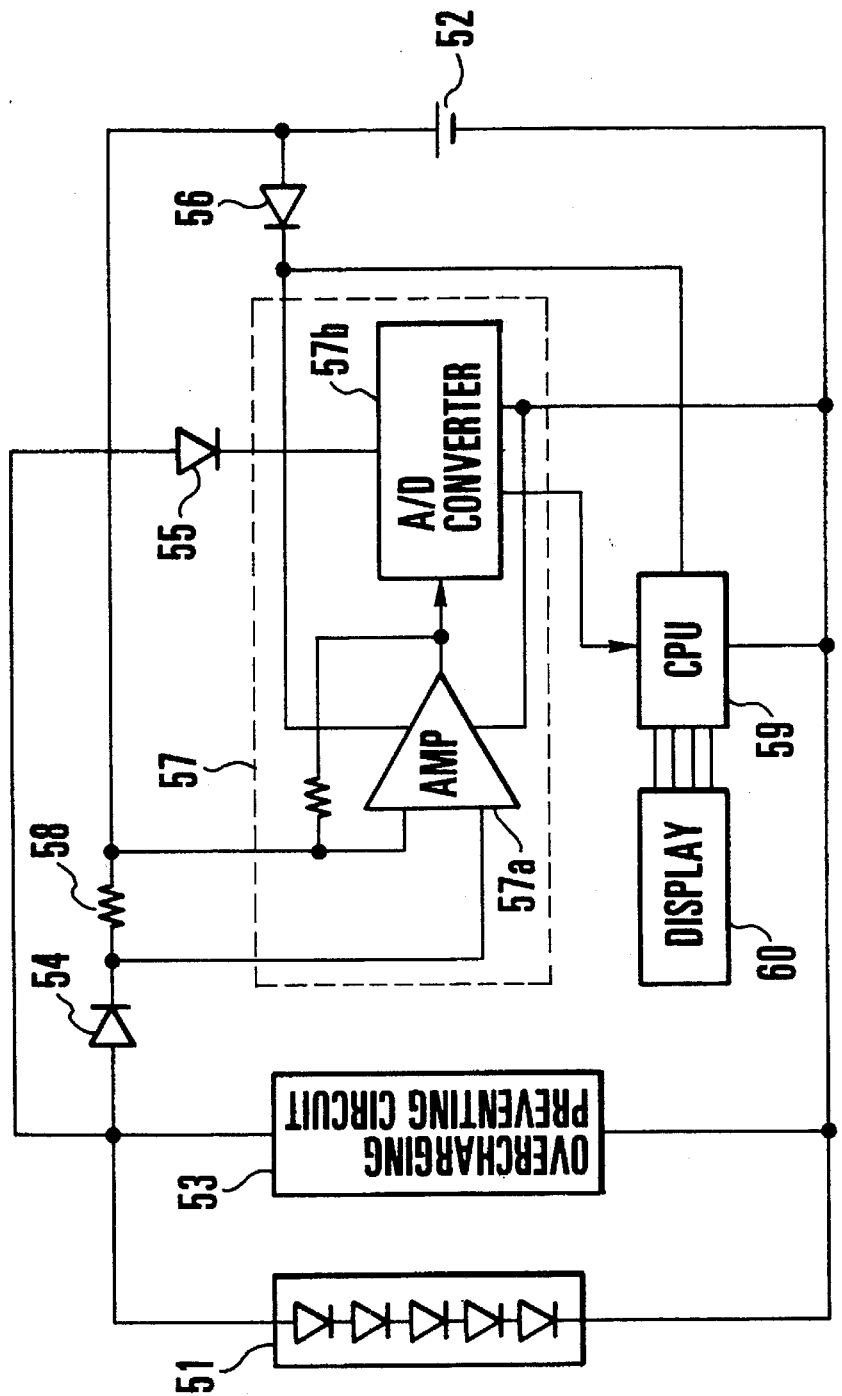
FIG. 8 is a circuit diagram showing one example of the arrangement of a conventional power source device which uses a solar battery.
Figure 9:
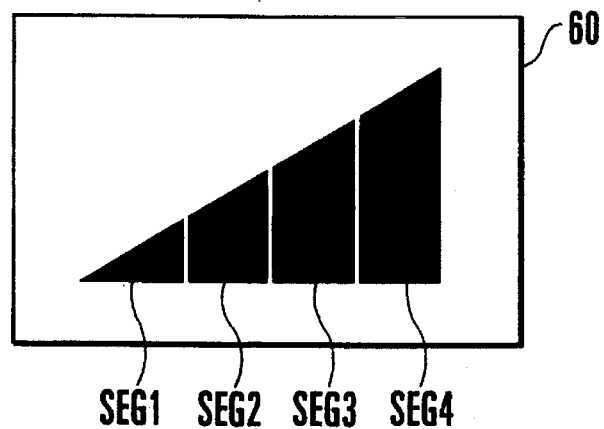
FIG. 9 is a schematic view showing the construction of the display shown in FIG. 8.
Figure 10:
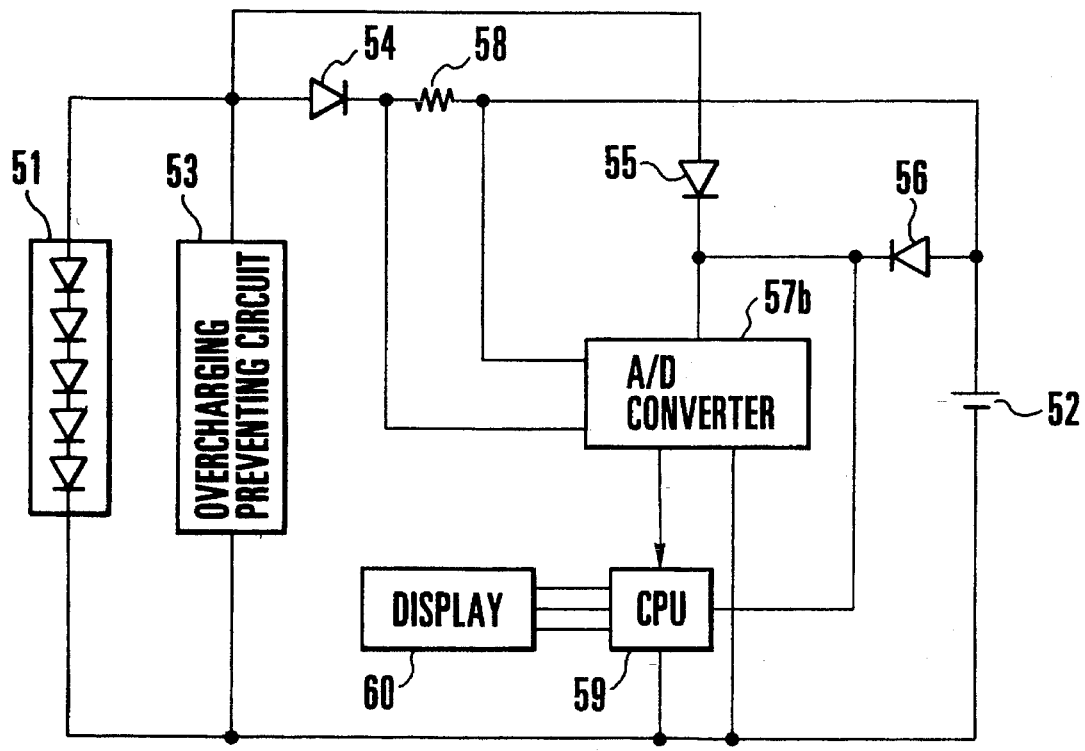
FIG. 10 is a circuit diagram showing another example of the arrangement of a conventional power source device which uses a solar battery.

FIGS. 6 and 7 are informative of a power source device which uses a solar battery according to a second embodiment of the present invention. FIG. 6 is a flowchart showing the operation of detecting the electricity generating capability of the solar battery, and FIG. 7 is a timing chart of this operation. The circuit arrangement of the power source device is similar to that shown in FIG. 1, and the description thereof is omitted for the sake of simplicity. The second embodiment differs from the first embodiment in that the capacitors 16 and 17 which serve as power sources for the CPU 23 and other constituent elements have a capacity greater than those shown in FIG. 1.

Referring to the flowchart shown in FIG. 6, when the user switches the switch 26 to the side of the contact "a" to know the electricity generating capability of the solar battery 1, electric power is supplied to the CPU 23 from the higher-voltage side of the solar battery 1 and the secondary battery 2. At this time, the process proceeds from Step 201 to Step 202. In Step 202, the CPU 23 waits for a predetermined time $T_2$ to elapse (for example, a time which is four times as long as the predetermined time $T_1$ used in the first embodiment). When the predetermined time $T_2$ elapses, the process proceeds to Step 203, in which the switching transistor 7 is held in the on state for a predetermined time. Similarly to the case of the first embodiment, when the switching transistor 7 is on, the electric current generated by the solar battery 1 flows to the resistance 11, and the voltage produced across the resistance 11 is detected by the voltage detecting circuit 22 and the voltage detecting circuit 22 outputs a high- or low-level signal. In the next Step 204, the CPU 23 makes a determination as to the result of this voltage detection. If the CPU 23 determines that a low-level signal has been inputted, then the CPU 23 determines that the electricity generating capability of the solar battery 1 has not reached Level 1, and returns the process to Step 202. The electricity generating capability of Level 1 takes on a value which is determined by the following expression:

Level-1 generated current (A)=(voltage-detecting-means reference voltage (V)/resistance 11 (Ω))

In this case, the CPU 23 turns off all of the segments SEG1 to SEG4 of the display 24.

If it is determined in Step 204 that a high-level signal has been inputted from the voltage detecting circuit 22 (the result of the voltage detection is OK), the process proceeds from Step 204 to Step 205, in which the setting of Level 1 is held. Then, in Step 206, the switching transistor 8 is held in the on state for a predetermined time to immediately select the next load current. Thus, the resistance 12 is connected to the solar battery 1 as a load, and the voltage produced across the resistance 12 is detected by the voltage detecting circuit 22 and the voltage detecting circuit 22 outputs a high- or low-level signal similarly to the processing of Step 203. In the next step 207, the CPU 23 makes a determination as to the result of this voltage detection. If the CPU 23 determines that a low-level signal has been inputted, then the process proceeds to Step 215, in which the CPU 23 determines that the solar battery 1 does not have a sufficient electricity generating capability to turn on the segment SEG2, and causes the process to proceed to Step 216. In Step 216, only the segment SEG1 of the display 24 is turned on.

If it is determined in Step 207 that a high-level signal has been inputted from the voltage detecting circuit 22, the process proceeds from Step 207 to Step 208, in which the setting of Level 2 is held. Then, in Step 209, the switching transistor 9 is held in the on state for a predetermined time to select the next load current. Thus, the resistance 13 is connected to the solar battery 1 as a load, and the voltage produced across the resistance 13 is detected by the voltage detecting circuit 22 and the voltage detecting circuit 22 outputs a high- or low-level signal similarly to the processing of Step 206. In the next step 210, the CPU 23 makes a determination as to the result of this voltage detection. If the CPU 23 determines that a low-level signal has been inputted, then the process proceeds to Step 215 similarly to the processing of Step 207. In Step 215, the CPU 23 determines that the solar battery 1 does not have a sufficient electricity generating capability to turn on the segment SEG3, and causes the process to proceed to Step 216. In Step 216, only the segments SEG1 and SEG2 of the display 24 are turned on.

If it is determined in Step 210 that a high-level signal has been inputted from the voltage detecting circuit 22, the process proceeds from Step 210 to Step 211, in which the setting of Level 3 is held. Then, in Step 212, the switching transistor 10 is held in the on state for a predetermined time to select the next load current. Thus, the resistance 14 is connected to the solar battery 1 as a load, and the voltage produced across the resistance 14 is detected by the voltage detecting circuit 22 and the voltage detecting circuit 22 outputs a high- or low-level signal similarly to the processing of Step 209. In the next step 213, the CPU 23 makes a determination as to the result of this voltage detection. If the CPU 23 determines that a low-level signal has been inputted, then the process proceeds to Step 215 similarly to the processing of Step 210. In Step 215, the CPU 23 determines that the solar battery 1 does not have a sufficient electricity generating capability to turn on the segment SEG4, and causes the process to proceed to Step 216. In Step 216, the segments SEG1, SEG2 and SEG3 of the display 24 are turned on.

In the second embodiment as well as in the first embodiment, the higher-voltage side of the solar battery 1 and the secondary battery 2 are selected as an actual power source for the CPU 23. However, if the secondary battery 2 does not at all have electrical energy, the operation of the second embodiment is performed as shown in the timing chart of FIG. 7. The state of the visual display provided on the display 24 in this operation is shown in FIG. 3. As shown in FIG. 7, when the switching transistors 7 to 10 are selected, the amount of charge of the backup capacitors 16 and 17 becomes gradually lower with the result that the source voltage of the CPU 23 becomes lower. This phenomenon is due to the facts that the consumed current required to select the switching transistors 7 to 10 flows into the CPU 23 and that the voltage fluctuates to a small extent during the period in which the solar battery 1 is selected. For the above-described reason, as a matter of course, the capacities of the respective capacitors 16 and 17 are set so that the power level of the solar battery 1 can be prevented from becoming lower than the minimum driving voltage for the CPU 23.

If it is determined in Step 213 that a high-level signal has been inputted from the voltage detecting circuit 22, the process proceeds from Step 213 to Step 214, in which the setting of Level 4 is held. In Step 215, the CPU 23 determines that the solar battery 1 has a very high electricity generating capability, and causes the process to proceed to Step 216. In Step 216, all the segments SEG1 to SEG4 of the display 24 are turned on.

The above-described operation is repeatedly performed while the switch 26 is switched to the side of the contact "a" and electric power is being supplied.

In the above-described first embodiment, a charging stabilizing time ($T_1$) for the capacitors 16 and 17 is provided before each load-current switching cycle. In the second embodiment, the wait time of $T_2$ is provided in the first step, and a sufficient electric current to be consumed by the CPU 23 during successive load-current switching cycles is backed up during that time. Thus, accidental resetting of the CPU 23 can be prevented similarly to the first embodiment.

In each of the first and second embodiments, the plurality of load resistances 11 to 14 are provided in parallel with the solar battery 1, and the switching transistors 7 to 10 are provided so that they can be sequentially turned on to perform sequential switching of the load currents. The voltage provided by the solar battery 1 during such sequential switching operation is detected by the voltage detecting circuit 22, thereby detecting the electricity generating capability (power generation level) of the solar battery 1. Accordingly, the rate of current consumption during this detecting operation can be reduced, whereby it is possible to detect even a low, electricity generating capability of the solar battery 1. In addition, unlike the conventional arrangement, the resistances 11 to 14 are not disposed in the charging loop for charging the secondary battery 2, as described previously, so that the electrical energy generated by the solar battery 1 can be efficiently stored in the secondary battery 2.

Further, since the switching transistors 7 to 10 are sequentially turned on in that order, i.e., the load currents are sequentially switched in order from the smallest load current, it is possible to accurately detect and display the electricity generating capability of the solar battery 1, whether low or high. For example, if the electricity generating capability is as low as Level 1, an amount of time is taken until sufficient energy is stored in the capacitors 16 and 17. During this time, if the secondary battery 2 has no charge at all and if the load currents are sequentially selected in order from the largest load current, electric power for the CPU 23 may suddenly run short so far as there is no electrical energy other than the backup charge of the capacitors 16 and 17. As a result, the CPU 23 may be reset and no visual display may be provided on the display 24 even if the actual electricity generating capability of the solar battery 1 is at Level 1. To prevent such a problem, the load currents are sequentially switched in order from the smallest load current in each of the first and second embodiments.

Further, since the reference voltage $V_{REF}$ of the comparator 22a in the voltage detecting circuit 22 is set higher than the minimum driving voltage for the CPU 23, it is possible to prevent malfunction, erroneous detection or accidental resetting of the CPU 23.

Further, when the electricity generating capability (power generation level) of the solar battery 1 is detected, the display 24 visually displays the result of the latest detected electricity generating capability by selectively turning on and off the segments SEG1 to SEG4. Accordingly, the display 24 can provide a visual display which can easily inform the user of the latest power generation level of the solar battery 1 each time the electricity generating capability is detected.

Further, since the switch 26 is provided for disconnecting the charging loop during the detection of the electricity generating capability of the solar battery 1, it is possible to more accurately detect the electricity generating capability.

Further, the capacitors 16 and 17 are provided for supplying electric power to the electricity-generating-capability detecting means made up of the CPU 23 and the associated constituent elements, and are arranged to receive electric power from the higher-voltage side of the solar battery 1 and the secondary battery 2. Accordingly, even if the secondary battery 2 does not at all have electrical energy, the power generation level of the solar battery 1 can be detected with the solar battery 1 alone.

In either of the above-described embodiments, in determining the state of electricity generation of the solar battery, the loads are sequentially switched so that the load current of the solar battery can sequentially change from a small-current state to a large-current state. However, the present invention can be applied to any type of switching method.

The present invention can also be applied to any power source other than the solar battery.

Although the display 24 visually displays the electricity generating capability through the four segments SEG1 to SEG4, it is, of course, possible to use a greater number of segments. As a matter of course, the form of the visual display provided on the display 24 is not limited to only the above-described one.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention can also be carried out by combining the above-described embodiments or technical elements thereof with each other, as required.

The present invention can be applied to other kinds of arrangements. For example, the whole or part of the arrangement set forth herein or in the appended claims may constitute one apparatus, or may be connected to other apparatus, or may constitute an element which forms part of another apparatus.

The present invention can also be applied to various types of cameras such as a single-lens reflex camera, a lens shutter camera or a video camera, optical apparatuses other than such cameras, apparatuses other than the optical apparatuses, apparatuses adapted for the cameras or the optical or other apparatuses, or elements which constitute part of such apparatuses.

What is claimed is:

1. An apparatus for determining a state of electricity generation of a solar battery, comprising:

(A) a first device which selectively connects ones of different loads to the solar battery; and (B) a second device which determines a state of electricity generation of the solar battery in accordance with a state of a load current flowing through a load connected to the solar battery by said first device.

2. An apparatus according to claim 1, further comprising a chargeable unit to be charged by the solar battery.

3. An apparatus according to claim 2, wherein said chargeable unit includes a secondary battery.

4. An apparatus according to claim 2, wherein said first device comprises means for connecting the different loads to the solar battery outside of a charging path for charging the chargeable unit by the solar battery.

5. An apparatus according to claim 2, further comprising a third device which causes said second device to operate, said third device preventing said chargeable unit from being charged by the solar battery when said third device causes said second device to operate.

6. An apparatus according to claim 1, wherein said second device comprises means for comparing a level of the load current of the solar battery with a predetermined value.

7. An apparatus according to claim 6, wherein the predetermined value is set higher than a minimum driving level at which said second device can be driven.

8. An apparatus according to claim 1, wherein said second device comprises means for determining the state of electricity generation of the solar battery relative to each of the different loads.

9. An apparatus according to claim 1, wherein said first device comprises means for selectively connecting the different loads to the solar battery so that the load varies from a large load to a small load.

10. An apparatus according to claim 1, further comprising the solar battery the state of electricity generation of which is determined by said second device.

11. An apparatus according to claim 1, further comprising resistances having different resistance values, said resistances respectively serving as the different loads to be connected to the solar battery by said first device.

12. An apparatus according to claim 1, further comprising a display device which displays the state of electricity generation of the solar battery determined by said second device.

13. An apparatus having a device for determining a state of electricity generation of a solar battery, comprising:

(A) a first device which selectively connects ones of different loads to the solar battery; and (B) a second device which determines a state of electricity generation of the solar battery in accordance with a state of a load current flowing through a load connected to the solar battery by said first device.

14. An apparatus according to claim 13, further comprising a chargeable unit to be charged by the solar battery.

15. An apparatus according to claim 14, wherein said chargeable unit includes a secondary battery.

16. An apparatus according to claim 14, wherein said first device comprises means for connecting the different loads to the solar battery outside of a charging path for charging the chargeable unit by the solar battery.

17. An apparatus according to claim 14, further comprising a third device which causes said second device to operate, said third device preventing said chargeable unit from being charged by the solar battery when said third device causes said second device to operate.

18. An apparatus according to claim 13, wherein said second device comprises means for comparing a level of the load current of the solar battery with a predetermined value.

19. An apparatus according to claim 18, wherein the predetermined value is set higher than a minimum driving level at which said second device can be driven.

20. An apparatus according to claim 13, wherein said second device comprises means for determining the state of electricity generation of the solar battery relative to each of the different loads.

21. An apparatus according to claim 13, wherein said first device comprises means for selectively connecting the different loads to the solar battery so that the load varies from a large load to a small load.

22. An apparatus according to claim 13, further comprising the solar battery the state of electricity generation of which is determined by said second means.

23. An apparatus according to claim 13, further comprising resistances having different resistance values, said resistances respectively serving as the different loads to be connected to the solar battery by said first means.

24. An apparatus according to claim 13, further comprising a display device which displays the state of electricity generation of the solar battery determined by said second device.

25. An apparatus according to claim 13, wherein said apparatus includes a camera.

26. A device for determining a state of electricity generation of a solar battery, comprising a plurality of discrete and different electrical loads and control means for successively, individually connecting said different loads to said solar battery and determining said electricity generation state of said solar battery.

* * * * *